United States Patent [19]
Kishbaugh

[11] Patent Number: 6,075,226
[45] Date of Patent: Jun. 13, 2000

[54] PORTABLE HOLDING OVEN FOR WELDING ELECTRODES UTILIZING EXHAUST HEAT FROM WELDING MACHINE

[76] Inventor: Daniel J. Kishbaugh, 12A N. Main St., Derry, N.H. 03038

[21] Appl. No.: 09/175,638

[22] Filed: Oct. 20, 1998

[51] Int. Cl.[7] .................................................. B23K 9/26
[52] U.S. Cl. .......................................... 219/133; 219/136
[58] Field of Search .................................... 219/133, 136, 219/137 R, 137.2

[56] References Cited

U.S. PATENT DOCUMENTS

| 4,952,773 | 8/1990 | Orsos et al. | 219/137.2 |
|---|---|---|---|
| 5,266,772 | 11/1993 | Reed | 219/136 |

FOREIGN PATENT DOCUMENTS

| 1157968 | 7/1969 | United Kingdom | 219/136 |
|---|---|---|---|
| 2044655 | 10/1980 | United Kingdom | 219/136 |

Primary Examiner—Clifford C. Shaw
Attorney, Agent, or Firm—Kenneth L. Milik

[57] ABSTRACT

A portable oven for holding shielded metal arc welding electrodes prior to their use. The holding oven utilizes the heated exhaust gases of a welding machine engine to maintain welding electrodes at an elevated temperature to prevent the absorption of moisture, which would adversely affect the quality of welds. The holding oven includes an insulated outer housing, which is positioned on or near an engine-driven welding machine. An interior rack for the electrodes is mounted in the upper portion of the housing and is accessible through a hinged door. A heat exchanger in the lower part of the housing is coupled to the exhaust pipe of the welding machine and radiates the exhaust heat into the interior of the housing before transferring the exhaust gases to a directional exhaust port. The holding oven may include means for measuring and regulating the interior temperature of the housing to keep the electrodes within a predetermined temperature range. In an alternative embodiment, the holding oven is integral with the welding machine housing.

22 Claims, 6 Drawing Sheets

PORTABLE HOLDING OVEN FOR WELDING ELECTRODES UTILIZING EXHAUST HEAT FROM WELDING MACHINE

FIELD OF THE INVENTION

The present invention relates generally to electrical arc welding, and more particularly to portable holding/drying ovens for arc welding electrodes, which ensure that welding electrodes are kept dry prior to use to prevent defective welds.

BACKGROUND OF THE INVENTION

Shielded-metal arc welding (SMAW) is a versatile welding process used for forming high quality welds. For example, in gas and chemical piping applications, the welds must be of the highest quality because a failed weld could be catastrophic. The quality or integrity of the welds are generally tested by X-rays or ultrasonic inspection equipment, which will reveal defects in the welds.

Shielded-metal arc welding is also a simple process in principle requiring only a high current source, insulated electrical cables, and an electrode holder for holding a consumable electrode, which is used to supply additional metal to form a continuous weld. Welding electrodes are also called welding "rods" or "wires". The high current source is supplied by a welding machine, which is basically an engine-powered electric generator.

A welding electrode for use in SMAW typically consists of a metal core surrounded by a flux covering. In the welding process, an electric arc is formed between the flux-covered metal electrode and the metal being welded. Particularly, the electric arc is generated by touching the tip of a coated electrode to the workpiece and withdrawing it an appropriate distance to maintain the arc. The heat generated melts a portion of the electrode tip, its coating, and the base metal in the immediate area. The electrode, as it moves down the length of the weld, is consumed. The molten electrode and the base metal must be shielded against the ambient atmosphere, which includes oxygen and nitrogen, which may interact with the molten metal and cause voids, porosity, and other weld defects. The shielding is supplied by the flux coating of the electrode. As the flux coating is consumed, it creates a gas shield which protects the weld from oxygen and nitrogen during the welding process and also forms a solid protective slag, which protects the weld during cooling, which must later be chipped away.

It is clear from the above discussion that the welding electrode with its flux coating is the most important element of the SMAW process. The composition and condition of the welding electrodes contribute to the quality of the welds. For high quality welding work, welding electrodes are composed generally of a high tensile strength steel core and an outer coating of low-hydrogen material, which may include iron and carbon powder. These "low-hydrogen" electrodes avoid the problems associated with defective welds, such as voids, porosity, lack of fusion, and slag inclusions, which may cause a weld to fail an X-ray inspection, for example. The low-hydrogen electrodes are therefore preferable for high-quality welding work. Electrodes of this type are commonly available from welding supply companies such as Lincoln, Hobart, and Merriam-Graves. Low-hydrogen electrodes are identified as 70-series electrodes, and include different grades and tensile strengths, identified by American Welding Society classifications 7018 through 7024.

Prior to use in the welding process, low-hydrogen electrodes must be properly stored and handled to prevent the absorption of atmospheric moisture which would degrade the low-hydrogen coating on the rods and result in poor quality welds. Moisture is eliminated by keeping the welding electrodes at an elevated temperature within a specified temperature range immediately prior to their use. Welding electrodes are typically sold in boxes that have a moisture proof packaging. These sealed boxes are often carried separately to the work-site, where the welding process will be performed. When the packaging is opened, the moisture-proofing is breached, and the welding electrodes must be transferred to a holding oven as soon as possible, to avoid moisture absorption by the welding electrode coating.

The problem is compounded because high quality welding work often occurs at remote locations, which is particularly true for gas and chemical piping work, for example. Because welding occurs in remote locations, welding machines include gasoline, diesel, or propane powered engines to generate electricity used in the arc welding process.

Portable electrical holding ovens are known for the storage of a small number of welding electrodes at the job site. These holding ovens operate exclusively on electric current. A number of companies manufacture electrode ovens such as Henkel Incorporated of Hammond, La.

There are two drawbacks to the presently available holding ovens. First, the known holding ovens do not hold a large number of electrodes, partly because the electric power requirements for heating a large quantity of welding electrodes would be excessive. Secondly, all known holding ovens are electrically-powered. At a remote welding site in particular, electric power outlets are generally not available. Welding machines typically include a plurality of electrical outlets for providing power to operate power tools, for example. However, portable electric holding ovens are often plugged into the welding machine outlets as the only available source of electricity at the remote site. A portable electric holding oven, when powered from the welding machine, puts a high electrical load on the welding machine, causing the welding machine engine to operate constantly at fast idle. This causes a greatly increased ambient noise level for the welding operator and excessive fuel consumption for the welding machine.

The present invention overcomes the disadvantages of the prior portable holding ovens, such as the requirement for electric power at remote locations.

SUMMARY OF THE INVENTION

A solution to the problems of prior electrode ovens is provided in the present invention, which furnishes the needed elevated temperatures and drying effects for welding electrodes in a portable holding oven, which operates without electricity. The present invention thereby avoids the problems of prior art ovens, which place a significant electrical load on the welding machine engine, causing it to fast idle.

The present invention is a portable holding oven for welding electrodes which utilizes the exhaust heat of the welding machine engine to keep a large quantity of electrodes at an elevated temperature for extended periods of time.

The holding oven includes an insulated, weatherproof outer housing of sufficient size to hold up to 50 pounds of welding electrodes. The interior of the housing includes a box-shaped electrode rack mounted in the upper portion of the housing for holding various types of electrodes on perforated shelving. A heat exchanger, in the lower part of the housing, receives heated exhaust gases from the welding machine exhaust and transfers the heat to the interior of the housing. The heat rises upwardly into the electrode rack, passing through the perforated shelves and elevating the temperature of the welding rods being held therein. The welding machine exhaust continues through the welding machine and exits the housing by means of an exhaust pipe. The housing includes an access door to provide the user with access to the electrode rack, for inserting and removing the electrodes, as needed. The door is gasketed and includes a tension latch to provide a tight seal. The door includes a thermometer to provide temperature readings inside the housing.

In use, the oven is placed on top of the welding machine. The exhaust from the welding machine is piped directly into the back of the oven through a connecting pipe which is custom contoured to fit the engine exhaust location of each make and model of welding machine. The connecting pipe is fitted with an insulated waterproof sleeve to prevent contact burns. This connecting pipe is attached with clamps so the oven is easily removed, yet stable enough for travel.

In an alternative embodiment, the holding oven is built into the housing of a welding machine and is integral with it. The electrode heating process is the same as in the portable unit except that heat is utilized directly from the welding machine's exhaust system, before the exhaust exits the welding machine.

BRIEF DESCRIPTION OF THE DRAWINGS

The foregoing and other objects, features and advantages of the invention will be apparent from the following more particular description of a preferred embodiment of the invention, in conjunction with the accompanying drawings. In the drawings.

DESCRIPTION OF THE PREFERRED EMBODIMENTS

Figure 1:
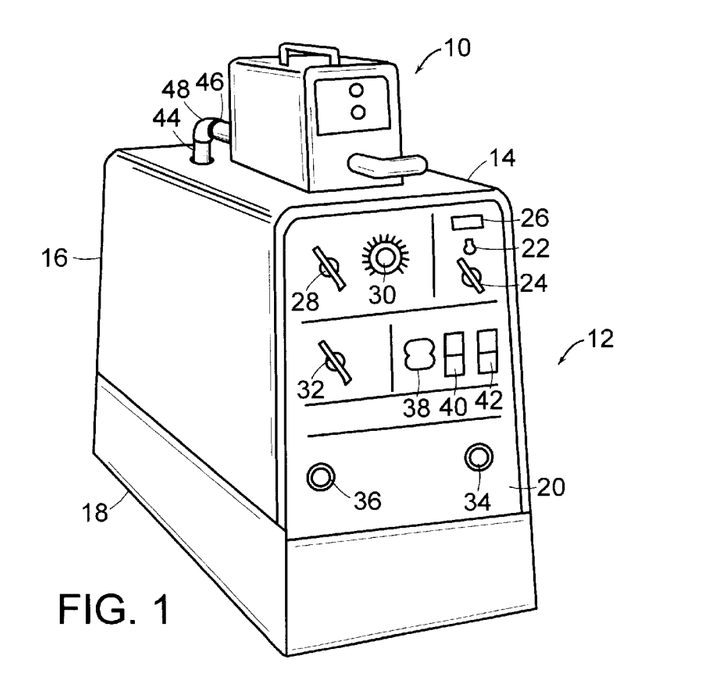
FIG. 1 is a perspective view of a welding machine with a holding oven according to the present invention installed thereon.

Turning initially to FIG. 1, a portable holding oven 10 in accordance with the present invention is shown installed for use on an arc welding machine 12. In the figure, the holding oven 10 is shown supported on the welding machine housing 14. The portable holding oven 10 of the present invention is used in conjunction with the welding machine 12; therefore, the basic structure and operation of a typical welding machine 12 will be discussed in detail in what follows.

The welding machine 12 functions as an engine-powered electrical generator to provide a regulated source of electric current for the welding process. Welding machines are available in different sizes and configurations.

The welding machine 12 would be used by a single operator in performing the arc welding process. Welding machines are typically powered by gasoline, diesel, or propane fueled engines. The welding machine 12 may be, for example, a Bobcat Model 225NT welding machine manufactured by Miller Electric Manufacturing Company of Appleton, Wis. In the preferred embodiment, the welding machine 12 in FIG. 1 includes a gasoline-fueled engine generally located within the rear portion 16 of the welding machine housing 14. The gasoline fuel tank is located in the base 18 of the welding machine 12.

A welding machine 12 such as the one shown in FIG. 1 might typically be transported in the back of a pickup truck to a construction site, where the arc welding process is being performed. Less commonly, the welding machine 12 may also be installed on a trailer which would then be towed by truck to the work site. The welding machine 12 weighs approximately six-hundred pounds. The welding machine housing 14 is approximately 36 inches in height, 18.75 inches in width and 48 inches in depth. These physical dimensions are sufficient to provide a platform-like area on the top of the welding machine housing 14 to support the holding oven 10 of the present invention.

The welding machine 12 incorporates a front panel 20, which includes a number of operator controls. In the upper right of the front panel 20, engine controls include an electric starter switch 22, an engine idling adjustment control 24, and an elapsed hours meter 26. In the upper left of the front panel 20, a range selector switch 28 provides selection of overlapping output AC & DC current ranges (for example, 50–100 amperes; 70–150 amperes; 85–225 amperes). A rotary switch 30 controls fine current selection within each range selected by the range selector switch 28. Various electrode sizes and compositions require different current settings for the welding process. A process selector switch 32 provides the selection of output options to support various types of arc welding processes, such as SMAW (shielded metal arc welding), FCAW (flux-cored arc welding), and GMAW (gas metal arc welding) processes. The present invention relates to the proper conditioning and handling of welding electrodes for high-quality SMAW welding processes, which is also known as manual metal arc (MMA) or stick welding.

The front panel 20 includes terminals 34 and 36 for the attachment of two heavily-insulated welding electrode cables. As previously stated, in the SMAW process, the welding machine 12 generates a high current source of electricity sufficient to melt a coated welding electrode. One cable is the negative ground cable, which terminates in a brass spring-loaded clamp that securely clamps to the workpiece. The other cable terminates in an electrode holder, which accommodates various-sized welding electrodes and includes a tightening means for firmly clamping a welding electrode in place; the electrode holder also acts as a handle for the operator and is designed to insulate the operator from the high electric currents used during welding.

The front panel 20 includes one 240-volt outlet 38 and two double 120-volt outlets 40 and 42 for powering auxiliary equipment—such as grinders, drills and other tools—as may be needed at the welding site. A conventional electric-powered holding oven would use one of these power outlets.

The welding machine 12 shown in FIG. 1 typically operates for 12 hours at slow idle on a single tank of gasoline fuel. Slow idle is a relatively low noise, low fuel consumption operating state. To perform the welding process, the operator increases engine speed by selecting fast idle with the idling adjustment control 24. In contrast, fast idle is a high noise, high fuel consumption operating state. When the welding machine 12 is being used continuously in the welding process, the fuel usage increases and the welding machine 12 typically operates for eight hours on the same quantity of fuel. When the welding machine 12 is not being used in the welding process, other electrical loads as provided through the outlets 38, 40 and 42 will cause the welding machine 12 to switch to fast idle, and the noise level will be much greater and fuel consumption will increase. It is therefore advantageous to limit the load on the engine exclusive of the power used in the welding process. As stated, prior electrically-powered holding ovens, designed to be used at a work site, have the disadvantage of causing the welding machine engine to operate at fast idle at all times while in use, thereby causing high noise pollution levels and excessive fuel consumption rates. The holding oven 10 of the present invention avoids these disadvantages by utilizing the exhaust heat discharged from the welding machine engine, as will be described.

The welding machine 12 includes an engine exhaust pipe 44, which protrudes through an aperture in the top rear of the welding machine housing 14. Some welding machine designs have the engine exhaust pipe 44 exit through the side of the welding machine housing 14, but the same principles of the invention apply.

The engine exhaust pipe 44 expels heated exhaust gases from the engine of the welding machine 12 in a typical manner. The holding oven 10 includes an intake pipe 46. In FIG. 1, the engine exhaust pipe 44 of the welding machine 12 is shown coupled to the intake pipe 46 by means of an intermediate pipe section 48, custom-shaped for the particular application and rigidly connected by conventional muffler clamps.

As shown in FIG. 1, the holding oven 10 is conveniently supported on the top surface of the housing 14. However, it is anticipated that the holding oven 10 of the present invention may be used with all types of welding machines including those of considerably smaller size. For smaller sized welding machines, the holding oven 10 may be positioned alongside the welding machine 10 instead of on top of it, provided that the engine exhaust pipe 44 may be coupled by intermediate piping connections 48 to the intake pipe 46 of the holding oven 10.

Figure 2:
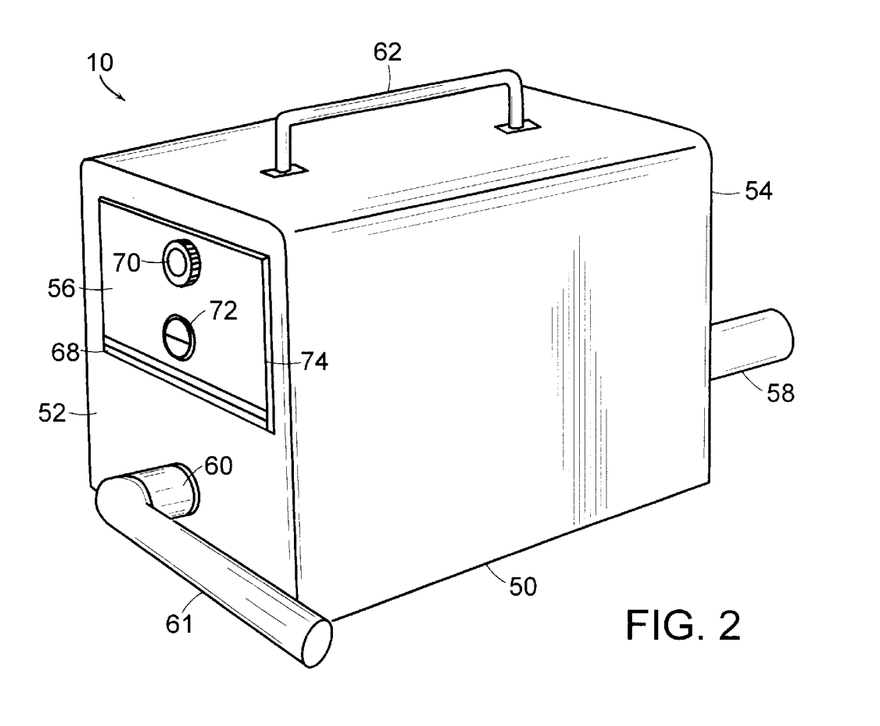
FIG. 2 is a perspective view of the holding oven according to the present invention, showing its major exterior features.
Figure 3:
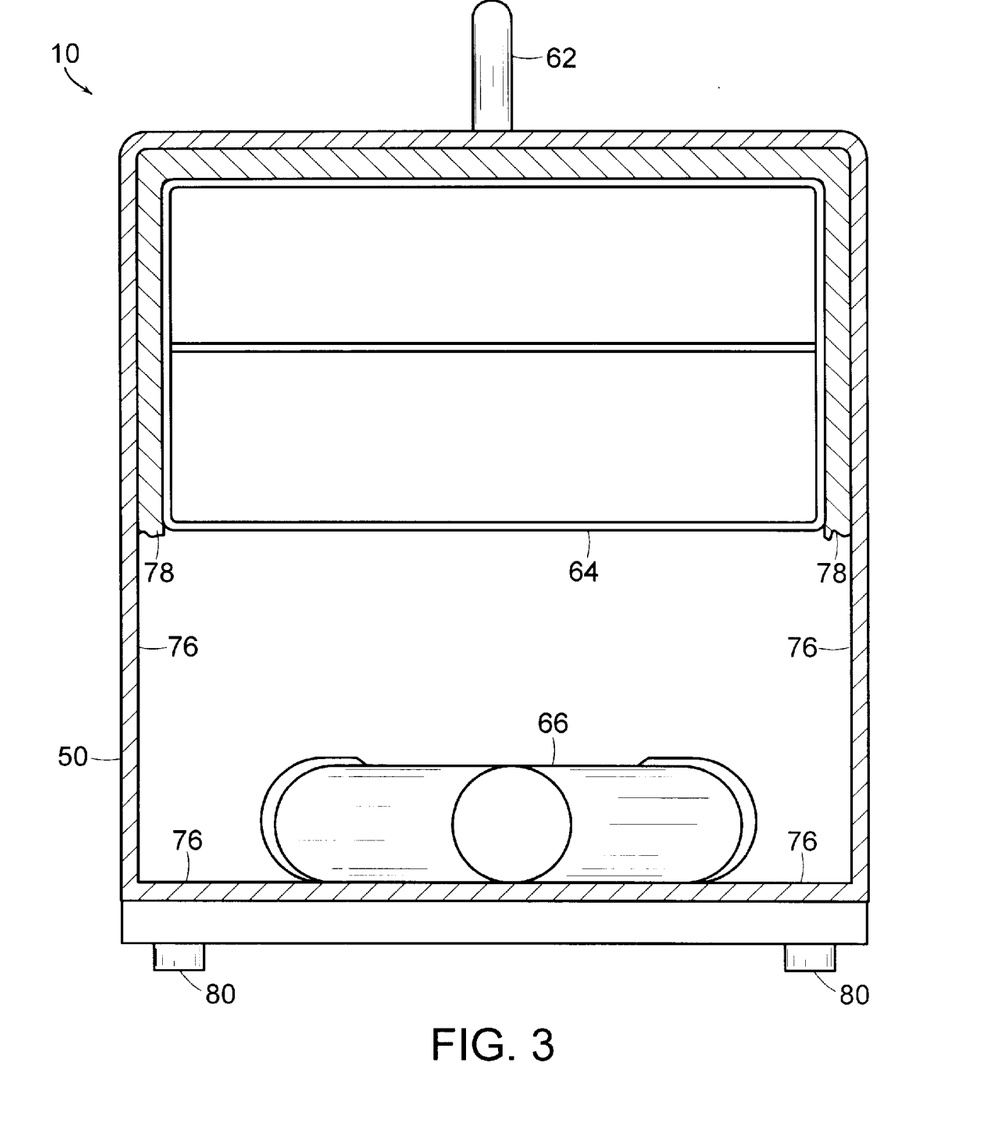
FIG. 3 is a front plan view of the holding oven of the present invention with the face plate removed so that its internal features are visible.

Turning now to FIG. 2 and FIG. 3, the major exterior and interior features of the holding oven 10 are shown. The present invention is a portable holding oven for drying metal arc welding electrodes, which is to be used at the site where the welding process is being performed. Such locations may be remote from electrical power sources, except for the power receptacles 40, 42 provided by the welding machine 12 itself, which are used to power conventional portable holding ovens. As stated, the holding oven 10 of the present invention is used at the site where the welding process is being performed, and has the advantage of not requiring electrical power, which would adversely affect the welding machine, causing it to run at high idle, as electrical holding ovens do.

The exterior of the holding oven 10 is shown in FIG. 2. The holding oven 10 includes the main features of a housing 50 which has a faceplate 52 and backplate 54, an access door 56 for inserting and removing welding electrodes, an intake pipe 58 for receiving exhaust gases from the welding machine 12; an exhaust pipe 60 for expelling the exhaust gases from the holding oven 10, including a swivel head 61; and carry handle 62.

The internal components of the housing are shown in FIG. 3, which is a front view illustration of the holding oven 10 with the faceplate 52 removed from the housing 50, so that the interior may be viewed. The interior of the housing 50 includes an electrode rack 64 for supporting the electrodes within the housing 50 and a heat exchanger 66 for radiating heat into the interior of the housing 50.

The housing 50 is fabricated from corrosion-resistant galvanized steel. The housing 50 is roughly ten inches wide by fifteen inches high by sixteen inches deep. The dimensions are somewhat determined by the size of welding electrodes to be heated within the housing. With the dimensions of the preferred embodiment, all common welding electrode types can be accommodated. It is anticipated that once the holding oven 10 is filled with electrodes, the electrodes will be kept in the holding oven 10 until they are used up. In the preferred embodiment, the welding oven 10 is designed to hold up to 50 pounds of welding electrodes. It follows that situations may arise where the user may need to carry or otherwise transport the oven with up to 50 pounds of welding electrodes inside. Therefore, in the preferred embodiment, the housing 50 is rigid and sturdy enough to survive normal use and transport while being fully loaded with welding electrodes. The carry handle 62 is bolted to the top of the housing 50. Likewise, the carry handle 62 and its connection to the housing 50 must be strong enough to support the weight of the holding oven 10, including a full load of welding electrodes.

The housing 50 along with the faceplate 52 and the backplate 54 are sealed to form an airtight enclosure. The faceplate 52, covers the front of the housing 50, and the backplate 54 covers the rear of the housing 50. The faceplate 52 and backplate 54 are welded to the housing 50 to form an airtight seal, to prevent leakage of moisture into the housing 50. The faceplate 52 includes cutouts for the access door 56 and for the exhaust pipe 60. The backplate 54 includes a cutout for the intake pipe 58.

The access door 56 door includes a hinge 68, a tension latch control 70, and a thermometer 72. The access door has a sandwich structure including a layer of insulation so that heat is not conducted from the interior of the housing 50 to the exterior of the access door 56. This prevents heat loss through the access door 50 and also provides a safety function to prevent burns to the hands of an operator using the holding oven 10. During a typical working day, as the welding process is being performed, the access door 56 will be opened and closed numerous times as the welding electrodes are removed, generally in small bunches, as needed.

The access door 56 pivots outwardly and downwardly to provide convenient access to the electrode rack 64 for inserting or removing welding electrodes. The door is supported for movement by a piano-type hinge 68, running the length of the lower edge of the access door 56. The access door 56 includes a gasket 74 around its edge to provide a moisture-proof seal. The access door 56 closes with a tension-latch control 70, which is pushed inwardly and rotated to squeeze and lock the access door 56 tightly against the faceplate 52 to ensure a watertight seal. Alternatively, the access door 56 could be spring-biased so that it would tend to close when released by the operator. Any other type of latch may be used to perform the same function as long as the access door 56 is held tightly closed and the seal is maintained to isolate the interior of the housing 50 from atmospheric moisture which could contaminate the welding electrodes.

The access door 56 also includes a small thermometer 72, mounted externally, to provide the operator with an indication of the temperature in the interior of the housing 50 in the proximity of the electrode rack 64. Alternatively, the thermometer 72 could be mounted inside the access door 56 or on the electrode rack 64 itself.

The interior of the housing 50 includes a layer of insulation 76 as shown in FIG. 3. The electrode rack 64 is separately insulated by a layer of insulation 78 on its top and sides but not on its bottom. In the preferred embodiment a dense heat-resistant, fiberglassbased insulation is used. The insulation layer 76 extends to the lower part of the housing under the heat exchanger 66 itself. The function of the insulation layer 78 is to keep the heat in the electrode rack 64. The function of the insulation layer 76 is to ensure that the heat radiated from the heat exchanger 66 is contained within the housing 50, and that the heat is not conducted to the external surface of the housing 50. Once again, the purpose of the insulation layer 78 is to prevent heat loss and burns to the hands of an operator using the holding oven 10.

Also shown in FIG. 3 are rubber feet 80. The four rubber feet 80, mounted to the underside of the housing 50 near its corners, prevent slipping of the holding oven 10 when positioned on top of the welding machine 12 during operation of the welding machine 1 2. This is necessary because the welding machine 12 vibrates slightly during operation. Without the rubber feet 80, the direct contact of the oven housing 50 with the welding machine housing 14 would cause scratches and marring to the welding machine housing 14. Generally, there is no concern with the holding oven 10 moving significantly or falling off the edge of the welding machine housing 14 because it is held in operating position by the weight of the holding oven 10 and by the rigid pipe connection 48 to the welding machine exhaust 44.

Figure 4:
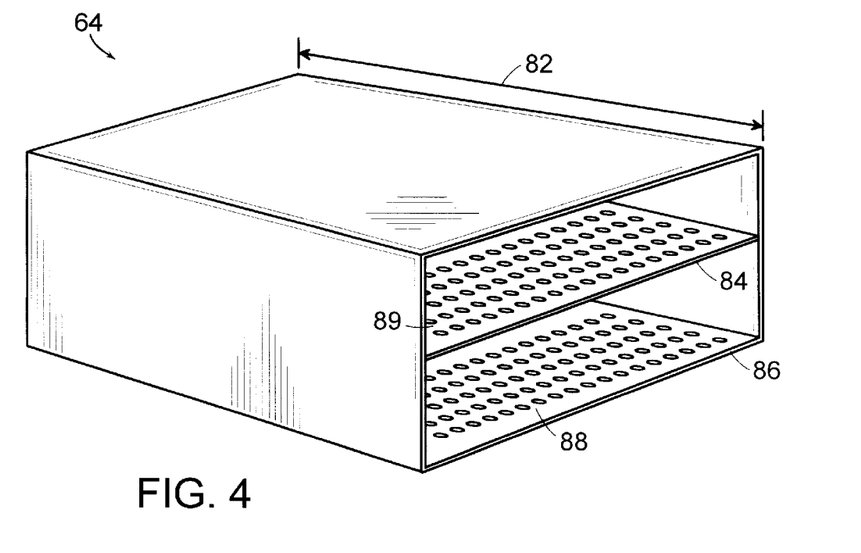
FIG. 4 is a perspective view of the electrode rack of the present invention.

Turning now to FIG. 4, the electrode rack 64 is shown in more detail. The electrode rack 64 holds the welding electrodes in the housing 50. The electrode rack 64 is a welded box like structure, opened at the front, fabricated from stainless steel. The electrode rack 64 is designed to hold 50 pounds of electrode electrodes. On a typical day, an operator will typically use ten to twelve pounds of welding electrodes. The size of the electrode rack 64 is somewhat determined by the dimensions and quantity of the welding rods it will hold. The length of an electrode is typically fourteen inches long. These include 70-Series rods, which are the type most commonly requiring heating in a holding oven. In the preferred embodiment, the electrode rack 64 has a depth dimension 82 of approximately sixteen inches to provide sufficient tolerance for loading and unloading the rods when the access door 56 is open.

In the preferred embodiment, the electrode rack 64 has two shelves, 84 and 86. The shelves 84 and 86 are fabricated from thin stainless steel and includes perforations 88 and 89. The perforations 88 and 89 allow the heat radiated from the heat exchanger to rise through the shelves 84 and 86 to reach the welding electrodes stored on both shelves 84 and 86. Stainless steel was chosen for the preferred embodiment because it is light weight but strong enough to support the maximum weight capacity of welding electrodes. It is also contemplated that the electrode rack could be manufactured from other galvanized corrosion resistant material with perforations punched therein, to reduce manufacturing cost. The more perforations 88 and 89 included in the shelves 84 and 86, the more effectively the heat will pass through the shelves 84 and 86, providing even heat distribution around the welding electrodes and efficient operation of the holding oven 10.

Alternatively, the electrode rack 64 could have three shelves for handling a greater quantity of welding electrodes, or a single shelf for holding a smaller quantity of welding electrodes. Also, the shelves 84 and 86 could be partitioned into multiple sections, each for holding a different type of welding electrode. All these variations are within the scope of the present invention, and the principles of the present invention still apply.

Figure 5:
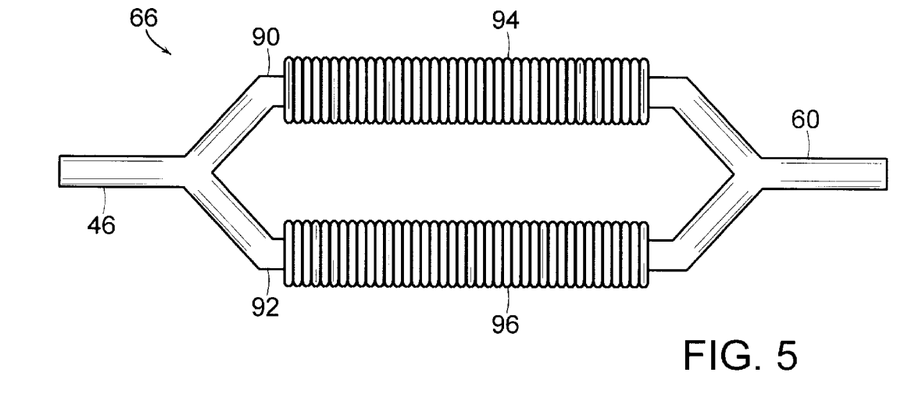
FIG. 5 is a top plan view of the heat exchanger of the present invention.

The heat exchanger 66 will now be described in connection with FIG. 5, FIG. 6, and FIG. 1. As stated, the welding machine exhaust pipe 44 provides sufficient heat for the drying of the welding electrodes. The purpose of the heat exchanger 66 is to transfer this heat from the exhaust pipe 44 of the welding machine 12, without allowing the exhaust gases to come into direct contact with welding electrodes in the welding oven 10. Furthermore, the heat exchanger 66 performs its function without restricting the exhaust flow from the welding machine 12. Restricting the exhaust flow of the welding machine 12 would interfere with smooth operation of the welding machine 12.

The heat exchanger 66 includes an intake pipe 46, two heat transfer sections 90 and 92, two radiator sections 94 and 96, and an exhaust pipe 60. The intake pipe 46 is constructed of steel tubing having an inside diameter of 1.5 inches, the same as the exhaust pipe 44 from the welding machine 12. The connection from the exhaust pipe 44 to the intake pipe 46 is by means of a hard-piped, rigid intermediate pipe section 48 connected by conventional muffler clamps. A rigid intermediate pipe 48 was chosen because flexible piping absorbs and radiates excessive amount of the exhaust heat; therefore, the heat loss would be excessive before the exhaust gases reach the heat exchanger 66 inside the oven housing 50. The purpose of the intermediate pipe section 48 is to conduct maximum heat through the intake pipe 46 to the heat enchanger 66.

The single intake pipe 58 pipe brances out into two parallel heat transfer sections 90 and 92. The heat transfer sections 90 and 92 include radiator sections 94 and 96. The radiator sections 94 and 96 are constructed from stainless steel bellowed piping. The bellowed piping is basically flexible-connection tubing which absorbs and radiates the heat passing through the heat exchanger 66. Flexible-connection tubing is thin walled and has been found to heat up and radiate heat very quickly. The bellowed piping has an inside diameter of 1.5 inches; maintaining the same diameter piping throughout ensures that the exhaust flow will not be restricted. The two radiator sections 94 and 96 increase the heat transfer of the heat exchanger, while not restricting the exhaust flow, which would negatively affect the performance of the welding machine 12, as stated. After the heat transfer operation, the radiator sections 94 and 96 recombine and exit the heat exchanger 66.

The heat exchanger is anchored in the lower interior of housing 50 by clamps. In the preferred embodiment, a single intake pipe 46 branches out into two heat transfer sections 90 and 92. It is contemplated, however, that three or more heat transfer sections may be used.

In operation, the exhaust gases from the welding machine 12 pass through the heat exchanger 66 but do not directly enter the housing 50 where the welding electrodes are being held. Exhaust gases contain chemical contaminants which would have an adverse affect on the welding rod coating. The heat exchanger 66 radiates the heat into the housing 50 but isolates the exhaust. Therefore, it is cautioned that perforated piping can not be used as a heat exchanger material. Alternatively, the heat exchanger 66 could be fabricated from aluminum, or with aluminum radiator sections 94 and 96. Aluminum is a better conductor of heat than steel; however, the connections would need to be dry connections made with muffler-type clamps, because steel can not be welded to aluminum. Also, alternatively, the heat radiator sections 94 and 96 could include radiating vanes which would increase the surface area of the radiator sections 94 and 96 to increase the efficiency of heat transfer, much like a conventional radiator. As another alternative, copper could be used for improved heat transfer in the heat exchanger 66.

The heat transfer sections 90 and 92 converge into a single exhaust pipe 60 which exits through the front of the holding oven 10.

Figure 6:
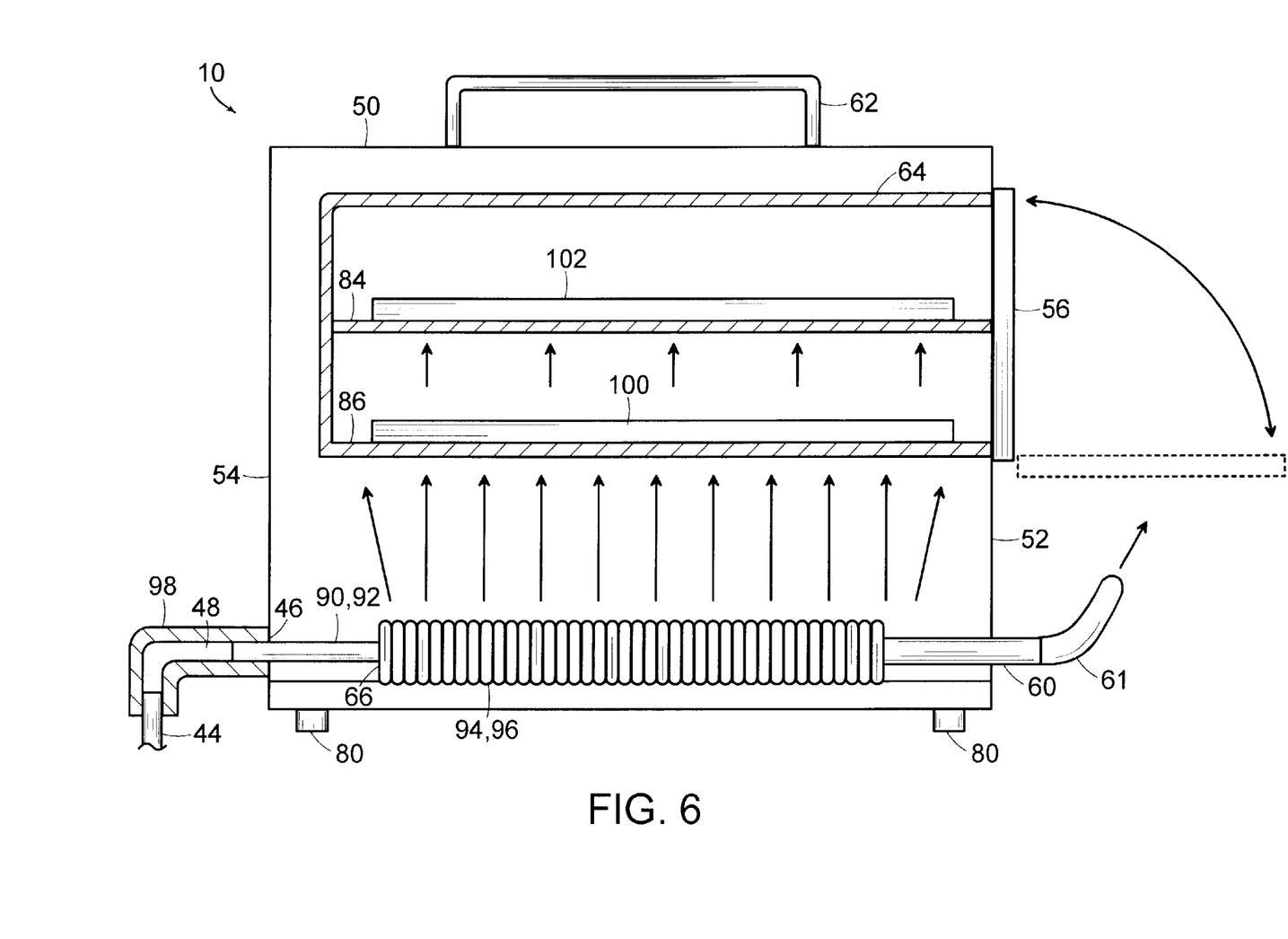
FIG. 6 is a partial left-side sectional view of the holding oven showing it operational features.

In FIG. 6, the heat flow within the holding oven is diagrammatically shown. Exhaust gases leave the exhaust pipe 44 of the welding machine 12, and are conducted through the intermediate pipe 48 into the intake pipe 46 of the heat exchanger 66. This transfer of exhaust gases takes place with very little heat loss. Alternatively, a waterproof insulating sleeve 98 may be used to cover the entire exposed connection from the exhaust pipe 44 through and including the intake pipe 46. The insulating sleeve 98 ensures that the heat loss would be minimal. Besides making the holding oven 10 more efficient by minimizing heat loss, the insulating sleeve 98 protects the user from burns to the hand, which could result from coming into contact with exposed steel piping. The exhaust gases enter the heat exchanger 66, passing into heat transfer sections 90 and 92. The radiator sections 94 and 96 rapidly heat up, raising the temperature of the air in contact with the exterior of the radiator sections 94 and 96. The heated air rises upwardly to the electrode rack 64 and passes through the perforated shelve 86, heating the welding electrodes 100 stored on the perforated shelf 86. The heated air continues to rise upwardly through the perforated shelf 84 to heat the welding electrodes 102 stored on perforated shelf 86. In the heat go exchanger 66, the exhaust gases continue to flow and exit the heat exchanger 66 at the exhaust pipe 60. The exhaust pipe 60 passes through the faceplate 52 and terminates in a swivel head 61 to divert the exhaust in a user-chosen safe direction. The swivel head 61 is necessary because the exhaust gases exit the holding oven 10 at high temperature.

Figure 7:
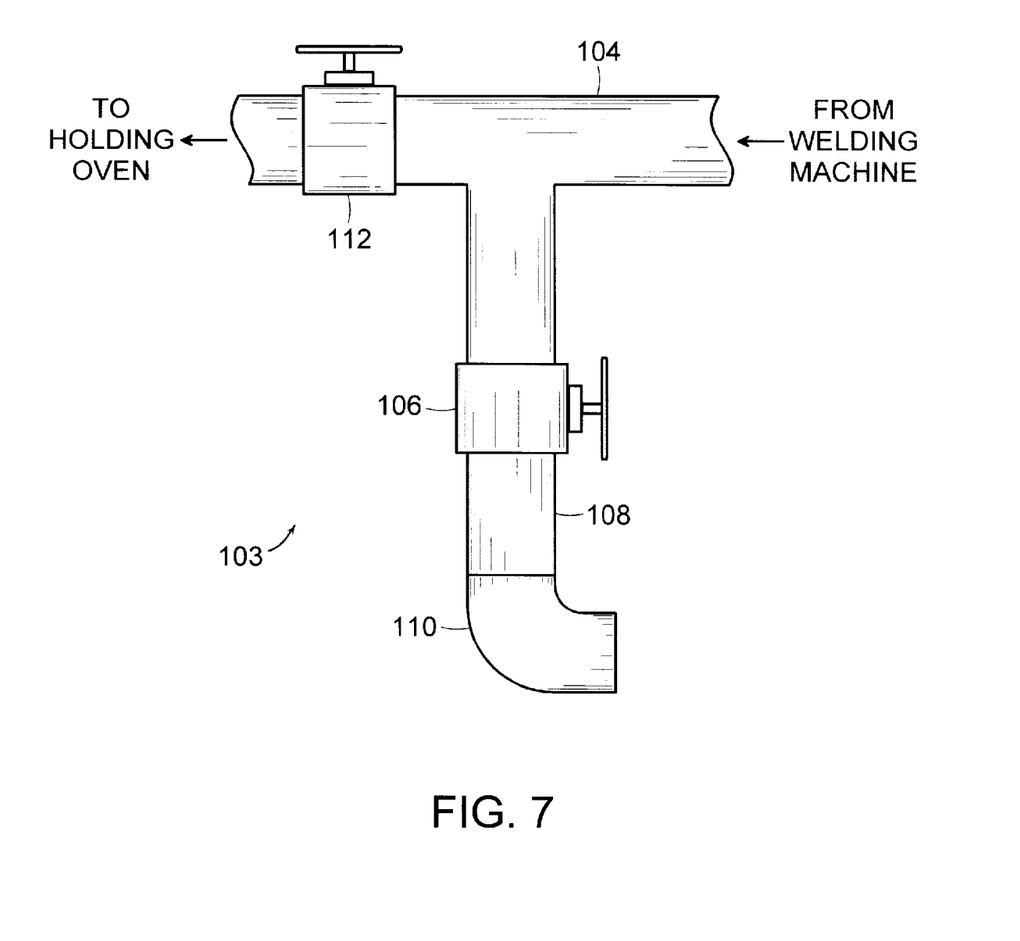
FIG. 7 is an illustration of a temperature regulation mechanism that may be used with the present invention for maintaining a specific temperature range within the oven.

Turning now to FIG. 7, a temperature regulation mechanism 103 is shown which may be used with or as part of the present invention to keep the temperature internal to the housing 50 within a chosen temperature range, generally between 100 and 150 degrees Fahrenheit. The temperature regulation mechanism 103 includes an intermediate pipe 104 for connection between the exhaust pipe 44 of the welding machine 12 and the intake pipe 46 of the welding oven 10. If the thermometer 72 indicates that the interior temperature of the holding oven 10 has exceeded the prescribed range, the user would open a first manually-operated knife valve 106 which would allow the exhaust gases to exit through a bypass pipe 108. The end of the bypass pipe 108 includes a swivel head 110, so that the exhaust flow may be directed in any user-selected direction, as desired. In addition, the user engages a second manually-operated knife valve 112, which closes off the exhaust flow to the holding oven 10. When the thermometer 72 indicates that the internal temperature of the holding oven 10 has dropped within the specified heat range, the process is reversed. The second manually-operated knife valve 112 is opened, allowing the exhaust flow to re-enter the holding oven 10, and the first manually-operated knife valve 106 is engaged, shutting off the bypass pipe 108.

It is contemplated that the regulation mechanism 103 may be separate from the holding oven 10 or be integral with it. For example, the first and second manually-operated knife valves 106 and 112 could be permanently and conveniently mounted in the backplate 54 where the intake pipe 46 enters the housing.

The holding oven 10 according to the present invention will generally operate within an acceptable temperature range without the regulation mechanism 103, as welding electrodes can not be harmed by highly elevated temperatures. For example, some drying ovens for welding electrodes are known that heat the welding electrodes up to 500 degrees Fahrenheit. The present invention does not require extremely high temperatures to be effective.

Figure 8:
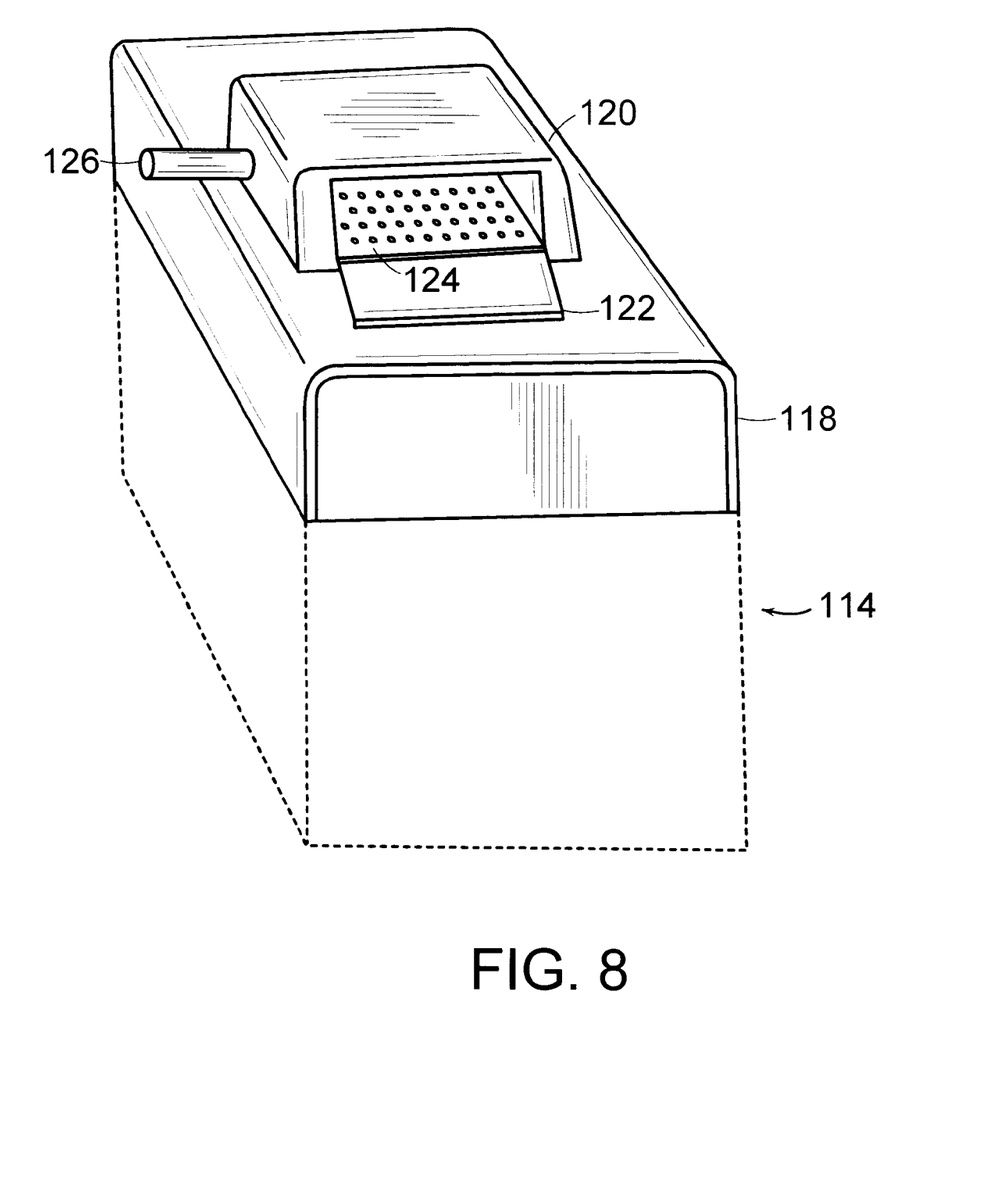
FIG. 8 shows an alternative embodiment of the present invention, in which the holding oven is integral with a welding machine housing.

Turning now to FIG. 8, an alternative embodiment is shown, in which a welding machine incorporates an intergral holding oven. The welding machine 114 includes an upper housing 118, and a holding oven compartment 120. The holding oven compartment 120 is located over the exhaust pipe area of the welding machine 114. The holding oven compartment 120 includes an access door 122, an electrode tray 124 made of perforated stainless steel, and an exhaust pipe 126. Functionally, the exhaust piping from the welding machine engine is routed under the holding oven compartment 120. The exhaust piping may include a heat exchanger. Heat from the exhaust piping rises through the perforations in the electrode tray to heat the welding electrodes stored thereon. The exhaust piping then continues out the exhaust pipe 126. The integral holding oven compartment 120 is conveniently manufactured to be part of the welding machine 114. Alternatively, existing welding machines may be retrofitted to include the holding oven compartment 120 by replacing the conventional upper housing 118 with a replacement that includes the holding oven compartment 120. The holding oven compartment 120 includes all the housing insulation and moisture-proofing as described in connection with the portable holding oven 10 of the present invention, and any or all of its other described features.

The description of the invention has been directed to certain exemplary embodiments. Various modifications of these embodiments, as well as alternative embodiments, will become readily apparent to those skilled in the art. For example, various economies of construction may be obtained by manufacturing the housing 50 out of heat-resistant plastic. Also, the housing 50 may include means for venting moisture to the exterior atmosphere. Further, various electrically-operated thermostatic valves could provide a more precise regulation of the interior temperature of the oven housing. These and other modifications are certainly within the scope of the present invention. Accordingly, the description is to be considered in all respects only as illustrative and not restrictive. The scope of the invention is indicated by the appended claims rather than by the foregoing description, and all changes which come within the meaning and range of equivalency of the claims are to be embraced within their scope.

What is claimed is:

1. An portable oven for drying welding electrodes for use with a engine-driven welding machine, comprising
   a housing;
   an electrode rack, within the housing, for holding the electrodes to by dried;

access door means for inserting and removing the electrodes to be dried;

intake port means, coupled to the welding machine, for receiving heated exhaust gases discharged from the engine of the welding machine;

heat exchanger means, coupled to the intake port means, for transferring heat from the heated exhaust gases into the interior of the housing to the electrode rack; and exhaust port means, coupled to the heat exchanger, for discharging waste exhaust gases therefrom;

wherein the electrode rack is maintained at an elevated temperature while the welding machine is operating.

2. A portable oven according to claim 1, wherein the electrode rack is mounted in the upper portion of the housing.

3. A portable oven according to claim 1, wherein the electrode rack includes a plurality of shelves.

4. A portable oven according to claim 1, wherein the electrode rack includes at a shelf having at least one partition.

5. A portable oven according to claim 1, further including directional pipe means, coupled to the exhaust port for directing the waste exhaust in a user-desired direction.

6. A portable oven according to claim 1, further including temperature sensing means for sensing the temperature inside the housing of the oven.

7. A portable oven according to claim 1, wherein the electrode rack includes perforated shelves for permitting the passage of heated air therethrough.

8. A portable oven according to claim 1, wherein the heat exchanger means is mounted in the lower part of the housing.

9. A portable oven for drying welding electrodes for use with a engine-driven welding machine, comprising a sealed housing;

an electrode rack, mounted in the upper part of the housing, for holding the electrodes to by dried, the electrode rack including a plurality of shelves, each shelf having perforations therein to allow the passage of heated air therethrough;

access door means for inserting and removing the electrodes to be dried;

latch means for securely holding the access door in a closed position;

temperature sensing means for sensing the temperature within the housing;

an intake port, coupled to the welding machine, for receiving heated exhaust gases discharged from the engine of the welding machine;

heat exchanger means, in the lower part of the housing, coupled to the intake port means, for transferring heat from the heated exhaust gases into the interior of the housing to the electrode rack;

exhaust port means, coupled to the heat exchanger, for discharging waste exhaust gases therefrom; and directional pipe means, coupled to the exhaust port for directing the waste exhaust in a user-desired direction;

wherein the electrode rack is maintained at an elevated temperature while the welding machine is operating.

10. A portable oven according to claim 9, further including means for regulating the interior temperature of the sealed housing.

11. A portable oven according to claim 10, wherein the means for regulating the interior temperature of the housing includes knife valve means to divert the exhaust gases discharged from the engine of the welding machine from entering the intake port of the oven.

12. A portable oven according to claim 9, wherein the heat exchanger means includes a plurality of heat radiators sections.

13. A portable oven according to claim 12, wherein the heat radiator sections are constructed from flexible metal tubing.

14. A portable oven according to claim 12, wherein the heat radiation sections include aluminum tubing.

15. A portable oven according to claim 12, wherein the heat radiation sections include copper tubing.

16. A method of drying welding electrodes prior to their use, comprising the steps of:

providing a moisture-proof housing for holding the welding electrodes to be dried;

inserting the electrodes in the housing prior to their use; and transferring heat continuously from the exhaust system of an engine-driven welding machine engine to the interior of the housing to heat the electrodes held within the housing.

17. A method of drying welding electrodes as recited in claim 16, wherein the step of transferring heat includes conducting the exhaust gases from the welding machine through a heat exchanger inside the moisture-proof housing.

18. A welding machine for arc welding comprising a housing, engine means within the housing;

generator means, within the housing and coupled to the engine, for generating a regulated electric current for welding;

an electrode compartment within the housing for drying welding electrodes prior to their use, comprising:

electrode tray means for holding electrodes prior to their use;

heat transfer means, for transferring at least some of the exhaust heat from the engine means to the electrode storage compartment; and access door means for inserting and removing the electrodes from the electrode compartment;

wherein the electrode compartment is maintained at an elevated temperature while the welding machine is in use.

19. A welding machine according to claim 18, wherein the heat transfer means includes a heat exchanger means for recovering heat from the exhaust gases of the engine means.

20. A welding machine according to claim 18, further including temperature sensing means for sensing the temperature inside the electrode compartment.

21. A welding machine according to claim 18, further including temperature regulation means for keeping the temperature in the electrode compartment within a prescribed range of temperatures.

22. A welding machine according to claim 18, further including perforated shelf means within the electrode compartment.

* * * * *

UNITED STATES PATENT AND TRADEMARK OFFICE
Certificate

Patent No. 6,075,226

Patented: June 13, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Dennis Morse, Wilmington, MA.

Signed and Sealed this Ninth Day of November 2004.

TOM G. DUNN
*Supervisory Patent Examiner*
Art Unit 1725